United States Patent
Wang et al.

(10) Patent No.: US 10,849,347 B2
(45) Date of Patent: Dec. 1, 2020

(54) SOY SAUCE TANK WITH CIRCULATION DETECTION FOR AMINO ACID NITROGEN VALUE CONTROL FOR SOY SAUCE

(71) Applicant: Lee Kum Kee (Xin Hui) Food Co., Ltd, Jiangmen (CN)

(72) Inventors: Gang Wang, Jiangmen (CN); Zhuobin Zhong, Jiangmen (CN)

(73) Assignee: LEE KUM KEE (XIN HUI) FOOD CO., LTD, Jiangmen (CN)

( * ) Notice: Subject to any disclaimer, the term of this patent is extended or adjusted under 35 U.S.C. 154(b) by 287 days.

(21) Appl. No.: 16/151,366

(22) Filed: Oct. 4, 2018

(65) Prior Publication Data
US 2019/0246675 A1 Aug. 15, 2019

(51) Int. Cl.
*A47J 37/12* (2006.01)
*A23L 27/50* (2016.01)
*A23L 3/3418* (2006.01)
*C01B 21/04* (2006.01)

(52) U.S. Cl.
CPC ............ *A23L 27/50* (2016.08); *A23L 3/3418* (2013.01); *C01B 21/0405* (2013.01)

(58) Field of Classification Search
CPC ...... A23L 27/24; A23L 33/105; A23L 33/175; A23L 3/3418; A23L 27/50; A23V 2002/00; C01B 21/0405
USPC .......... 99/276, 277, 278, 325; 426/7, 13, 14, 426/23, 28, 30, 38, 40, 254, 656
See application file for complete search history.

(56) References Cited

U.S. PATENT DOCUMENTS

2010/0203206 A1* 8/2010 Hayata .................. C12C 11/11
426/335
2019/0246674 A1* 8/2019 Wang ...................... A23L 27/50

FOREIGN PATENT DOCUMENTS

| JP | 5-123133 A | * | 5/1993 |
| JP | 2000-139400 A | * | 5/2000 |
| JP | 2002-209549 A | * | 7/2002 |
| JP | 2012-187489 A | * | 10/2012 |

* cited by examiner

*Primary Examiner* — Hung D Nguyen
(74) *Attorney, Agent, or Firm* — Tarolli, Sundheim, Covell & Tummino LLP

(57) ABSTRACT

A soy sauce tank with circulation detection for amino acid nitrogen value control for soy sauce, comprising a tank body, a circulation tube arranged outside the tank body and having an output end and an input end respectively connected to the tank body, a circulation pump arranged in the circulation tube, and an amino acid nitrogen value detection apparatus arranged in the circulation tube. The soy sauce tank of the invention comprises a circulation detection loop, in which the amino acid nitrogen value detection apparatus is configured to measure the amino acid nitrogen value of the soy sauce. In the soy sauce tank the soy sauce is thoroughly mixed through multiple circulations, during which its amino acid nitrogen value is regulated and stabilized eventually, thereby facilitating automatic blending and improving the production efficiency of the soy sauce.

14 Claims, 2 Drawing Sheets

SOY SAUCE TANK WITH CIRCULATION DETECTION FOR AMINO ACID NITROGEN VALUE CONTROL FOR SOY SAUCE

CROSS REFERENCE TO RELATED APPLICATIONS

This application claims priority from Chinese Patent Application No. 201820254367X, filed on Feb. 12, 2018. Entitled "Soy Sauce Tank with Circulation Detection for Amino Acid Nitrogen Value Control for Soy Sauce", the content of which is incorporated by reference herein in their entirety.

TECHNICAL FIELD

The invention relates to the field of soy sauce production, and in particular to a soy sauce tank with circulation detection for amino acid nitrogen value control for soy sauce.

BACKGROUND

In a production process of soy sauce, a fermentation step is required, in general comprising two sub-steps: in the first sub-step, raw materials are fermented for three months to obtain first extracted soy sauce; in the second sub-step, the raw materials, from which the first extracted soy sauce has been obtained through fermentation, is added with salt and then fermented for 15 more days to obtain second extracted soy sauce. Soy sauce ingredients in the raw materials are fully released during the two fermentation processes. Generally, obtained through the above fermentation processes, the first extracted soy sauce has an amino acid nitrogen value slightly higher than 0.8, while the second extracted soy sauce has an amino acid nitrogen value around 0.5-0.6. A suggested amino acid nitrogen value for the normal soy sauce ranges from 0.7 to 0.75. Therefore, a step for amino acid nitrogen value adjustment on the first extracted soy sauce and the second extracted soy sauce to produce finished soy sauce that satisfies product quality index is necessary. However, according to the existing art, the amino acid nitrogen value adjustment is carried out by manually adding and mixing, the efficiency is low.

To resolve the foregoing problem, the inventor has developed a system for adjusting the amino acid nitrogen value of the soy sauce, but a stable amino acid nitrogen value is required during soy sauce blending, therefore the inventor further provides a soy sauce tank with circulation detection for amino acid nitrogen value control for soy sauce.

SUMMARY

The aim of the invention is to provide a soy sauce tank with circulation detection for soy sauce amino acid nitrogen value control.

The soy sauce tank of the invention comprises: a tank body; a circulation tube, arranged outside the tank body and having an output end and an input end respectively connected to the tank body; a circulation pump, arranged in the circulation tube; and an amino acid nitrogen value detection apparatus, arranged in the circulation tube. The soy sauce tank has a circulation detection loop, and the amino acid nitrogen value detection apparatus is configured in the loop to measure the amino acid nitrogen value of the soy sauces. In the soy sauce tank the soy sauce is thoroughly mixed through multiple circulations, and its amino acid nitrogen value is regulated and stabilized eventually, thereby facilitating automatic blending and improving the production efficiency of the soy sauce.

As a further improvement to the foregoing technical solution, the tank further comprises a flow meter arranged in the circulation tube, which is configured to provide feedback regarding the circulation flow speed of the soy sauce, so as to ensure that the flow speed of the soy sauce is an average flow speed set by a system.

As a further improvement to the foregoing technical solution, the tank further comprises a valve, which is controllable in its opening degree, arranged in the circulation tube. By controlling the opening degree of the valve to control the flow speed of the soy sauce in the circulation tube, the requirement of the average flow speed set by the system is satisfied.

As a further improvement to the foregoing technical solution, the tank further comprises a liquid level detection apparatus arranged in the tank body.

As a further improvement to the foregoing technical solution, the liquid level detection apparatus comprises a high-liquid-level detection apparatus, a low-liquid-level detection apparatus interlocked with the circulation pump, and a continuous liquid-level detection apparatus. The high-liquid-level detection apparatus is configured to measure the liquid level in the tank body for maximum storage amount control of the soy sauce in the tank body, and the low-liquid-level detection apparatus is interlocked with the circulation pump for controlling the activation and deactivation of the circulation pump.

As a further improvement to the foregoing technical solution, the tank further comprises an output tube arranged outside the tank body, wherein the output tube is connected to the circulation tube and disposed downstream of the amino acid nitrogen value detection apparatus. Further, the output tube is provided with an output control valve. The output tube with the output control valve is provided, while it is by the amino acid nitrogen value detection apparatus detected that the indices of amino acid nitrogen and salt content of the soy sauce in the tank body are stable, the output control valve is opened to output the soy sauce.

As a further improvement to the foregoing technical solution, the tank further comprises a feed tube arranged at the top of the tank body, a feed pump arranged in the feed tube and interlocked with a high-liquid-level detection apparatus. The feed pump is configured to pump the soy sauce into the tank body from the top of the tank body through the feed tube. While it is by the high-liquid-level detection apparatus detected that the liquid level in the tank body of the soy sauce reaches an upper limit, the feed pump is deactivated.

As a further improvement to the foregoing technical solution, the tank further comprises a feed valve arranged between the feed pump and the tank body, through which the feeding of the soy sauce is controlled in the feed tube.

As a further improvement to the foregoing technical solution, the tank further comprises a transition tube connected between the feed tube and the circulation tube, a three-way valve arranged at an outlet end of the feed valve and connected to the transition tube, and a transition valve arranged in the transition tube. While the transition valve is opened, the soy sauce can be circulated in the circulation tube, the transition tube, and the feed tube, and while the transition valve is closed, the soy sauce can merely be circulated in the circulation tube. Resulting from the above, diversified circulation paths are provided.

As a further improvement to the foregoing technical solution, the feed pump is made of stainless steel, which has higher corrosion resistance and longer service life.

As a further improvement to the foregoing technical solution, the tank body is made of glass fiber, which has higher thermal resistance and corrosion resistance, thereby preventing the tank body from corrosion caused by long-standing fermentation of the soy sauce therein, and therefore prolonging the service life of the tank body.

As a further improvement to the foregoing technical solution, the circulation pump is made of stainless steel, which has higher corrosion resistance and longer service life.

The soy sauce tank provided by the invention comprises a circulation detection loop, and an amino acid nitrogen value detection apparatus arranged in the loop. In the soy sauce tank the soy sauce is thoroughly mixed through multiple circulations, during which the amino acid nitrogen value of the soy sauce is regulated and becomes stabilized, therefore automatic blending is facilitated and the production efficiency of soy sauce is consequently improved.

BRIEF DESCRIPTION OF THE DRAWINGS

Further advantages and configurations are explained in more detail in the following text on the basis of preferred exemplary embodiments of the invention, and in conjunction with the accompanying drawings, in which.

DETAILED DESCRIPTION

The soy sauce tank with circulation detection for soy sauce amino acid nitrogen value control according to the invention is described in detail below by embodiments with reference to the accompanying drawings.

Embodiment 1

Figure 1:
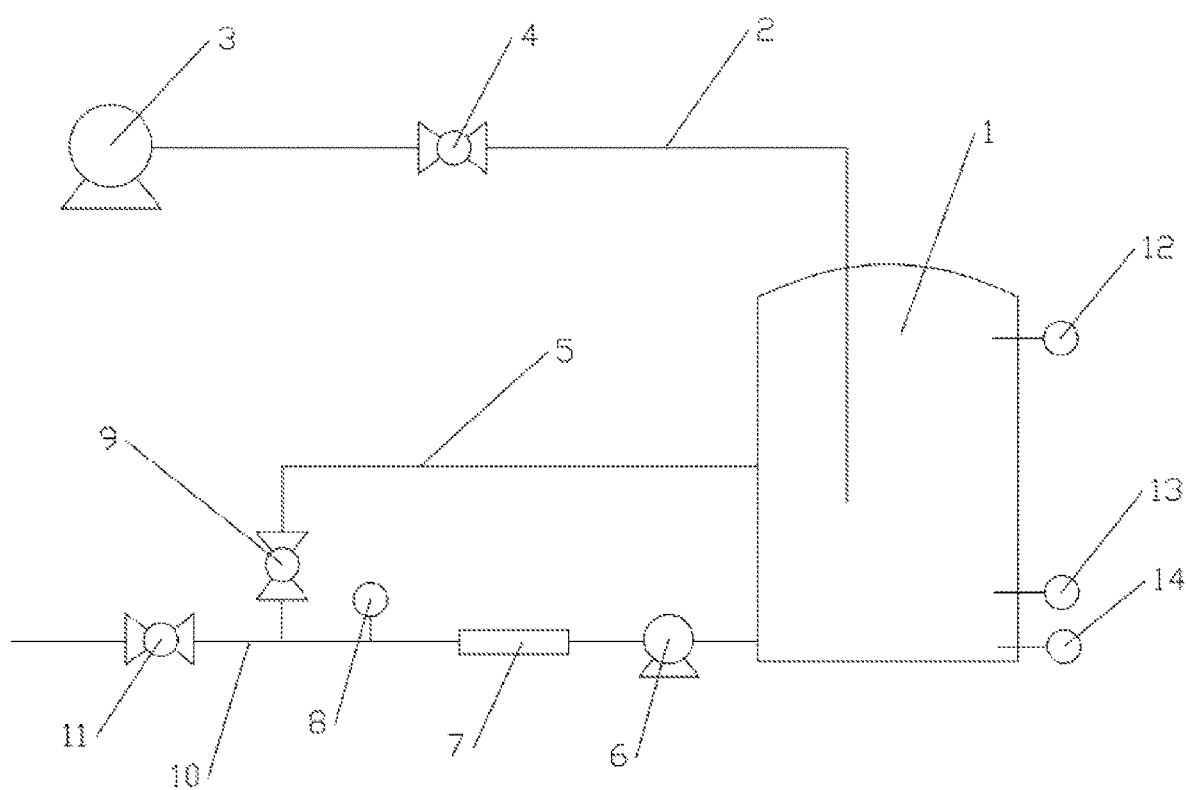
FIG. 1 is a schematic view of a system according to Embodiment 1 of the invention.

As shown in FIG. 1, a soy sauce tank with circulation detection for amino acid nitrogen value control for soy sauce according to a first embodiment of the invention comprises a tank body 1, which is made of glass fiber. In this embodiment, the tank body 1 has a diameter of 3.6 m, a height of 7.3 m, and a volume set to be 60 m$^3$. A feed tube 2 is arranged at the top of the tank body 1, a feed pump 3 is arranged in the feed tube 2, and a feed valve 4 is arranged between the feed pump 3 and the tank body 1. The feed pump 3 is made of stainless steel for higher corrosion resistance and longer service life. The feed pump 3 is activated and controlled in a star-delta manner, which is configured to pump the raw materials of soy sauce into the feed tube 2, further through the feed valve 4 which is in an opened state, into the tank body 1.

A circulation tube 5 is provided outside the tank body 1, having an output end and an input end respectively connected to the tank body 1. A circulation pump 6, a flow meter 7, and an amino acid nitrogen value detection apparatus 8 are sequentially arranged along the circulation tube 5. The circulation pump 6 is controlled by means of a frequency converter, the pump body is made of stainless steel for higher corrosion resistance and longer service life. A valve 9, which is controllable in its opening degree, is provided downstream of the amino acid nitrogen value detection apparatus 8. The soy sauce tank of the invention has a circulation detection loop, facilitating automatic soy sauce blending and consequently improving its production efficiency. The circulation pump 6 is configured to suck the soy sauce from the tank body 1, the flow meter 7 is configured to provide feedback about the circulation flow speed of the soy sauce. Based on the feedback provided by the flow meter 7, the opening degree of the valve 9 is adjusted for controlling the flow speed of the soy sauce in the circulation tube 5, so as to satisfy the requirements on average flow speed set by a system. The amino acid nitrogen value detection apparatus 8 is configured to detect the amino acid nitrogen value of the soy sauce. The soy sauce in the soy sauce tank is thoroughly mixed through multiple circulations, and the amino acid nitrogen value of the soy sauce is regulated into a stabilized value eventually. For a first extracted soy sauce, the amino acid nitrogen value is eventually stabilized around 0.8, and for a second extracted soy sauce, the amino acid nitrogen value is eventually stabilized between 0.5 and 0.6.

An output tube 10 is provided outside the tank body 1 and connected to the circulation tube 5. The output tube 10 is arranged downstream of the amino acid nitrogen value detection apparatus 8 and provided with an output control valve 11. While it is by the amino acid nitrogen value detection apparatus 8 detected that the indices of amino acid nitrogen and salt content of the soy sauce in the tank body 1 are stable, the output control valve 11 is opened to output soy sauce. While an accumulated flow amount calculated by the flow meter 7 reaches a required soy sauce amount, the discharge of the soy sauce is stopped, and the circulation pump 6 is deactivated and the output control valve 11 is closed.

Liquid level detection apparatuses are provided in the tank body 1, comprising a high-liquid-level detection apparatus 12, a low-liquid-level detection apparatus 13, and a continuous liquid-level detection apparatus 14, wherein the high-liquid-level detection apparatus 12 and the low-liquid-level detection apparatus 13 are configured to limit a liquid level range of the soy sauce in the tank body 1, and the continuous liquid-level detection apparatus 14 is configured to display a continuous liquid level of the soy sauce in the tank body 1.

The high-liquid-level detection apparatus 12 is interlocked with the feed pump 3, while it is by the high-liquid-level detection apparatus 12 detected that the liquid level of the soy sauce in the tank body 1 reaches an upper limit, the feed pump 3 is deactivated. The low-liquid-level detection apparatus 13 is interlocked with the circulation pump 6, while it is by the low-liquid-level detection apparatus 13 detected that the liquid level of the soy sauce in the tank body 1 drops to a lower limit, the circulation pump 6 is deactivated.

In operation, the feed pump 3 and the feed valve 4 are opened, whereby the soy sauce id fed into the tank body 1 through the feed tube 2. While it is by the continuous liquid-level detection apparatus 14 detected that the height of the soy sauce in the tank reaches 2.5 m, the valve 9 in the circulation tube 5 is opened and the circulation pump 6 is activated to pump the soy sauce in the tank body 1 into the circulation tube 5 for circulation and mixing. The soy sauce flows through the flow meter 7 which provided feedback of the flow speed of the soy sauce to a system (not shown). The system is configured to compare the flow speed with an average flow speed set in the system. Based on the comparison, the opening degree of the valve 9 is adjusted for controlling the flow speed. At the same time the flow meter 7 begins to calculate the flow amount. Then, the soy sauce flows through the amino acid nitrogen value detection apparatus 8, the amino acid nitrogen value detection apparatus 8 detects the amino acid nitrogen value and compares the detected value with an index set in advance in the system: if the amino acid nitrogen value does not satisfy the requirements, the soy sauce is pumped back into the tank body 1 and into the circulation tube 5 again for further circulation and mixing until the amino acid nitrogen value is stabilized in a particular range. After the requirements on the amino acid nitrogen value are satisfied, the soy sauce discharge begins. While it is by the high-liquid-level detection apparatus 12 detected that the liquid level in the tank reaches 6.5 m, the feed pump 3 is deactivated and the feeding of soy sauce is stopped.

While it is by the amino acid nitrogen value detection apparatus 8 detected that the index of amino acid nitrogen of the soy sauce is stable, the discharge time and speed are calculated according to a required amount of finished soy sauce, and the output control valve 11 is opened for discharge. The valve 9 in the circulation tube 5 is closed, and at the same time the flow meter 7 begins to calculate the flow amount and provide feedback of the flow speed of the soy sauce during discharge. While the calculated flow amount reaches the required amount of finished soy sauce, the circulation pump 6 is deactivated, and the output control valve 11 is closed, and thus the discharge is ceased. While it is by the low-liquid-level detection apparatus 13 on the tank body 1 detected that the liquid level in the tank drops to 0.55 m, the circulation pump 6 is deceived for preventing the circulation pump 6 from damage caused by dry pumping.

Embodiment 2

Figure 2:
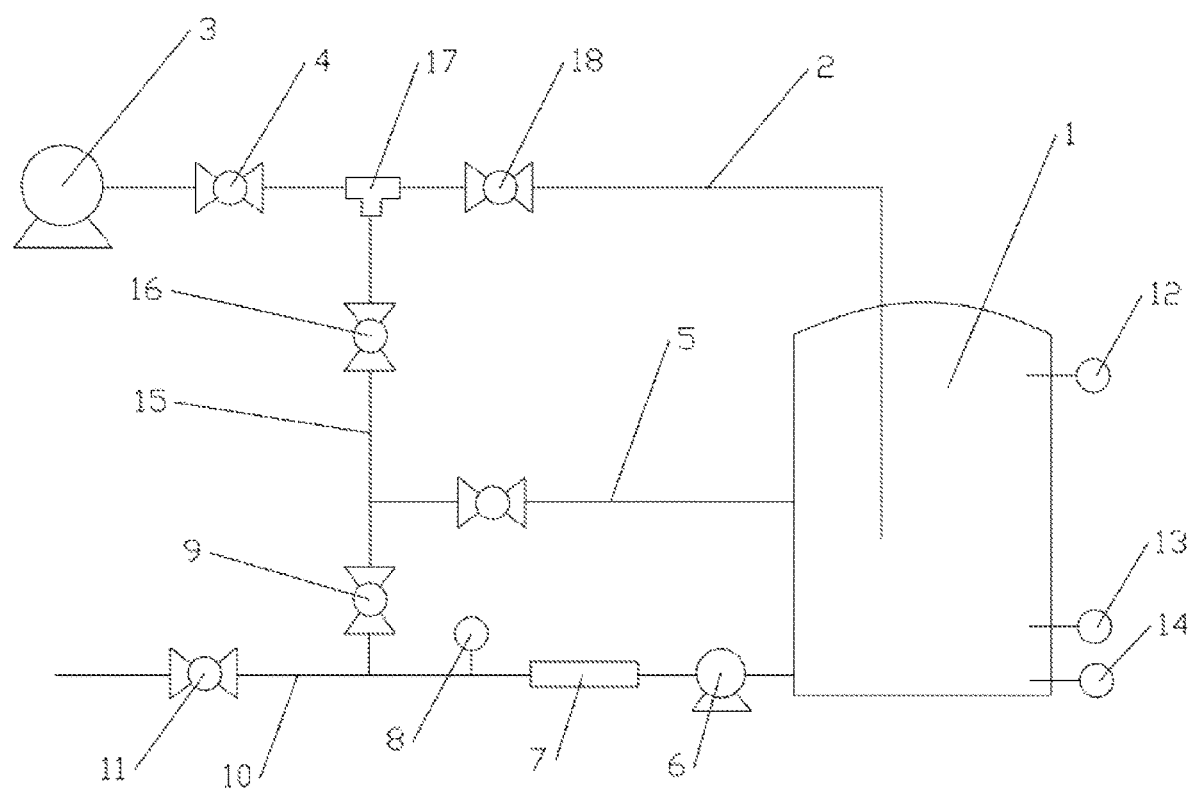
FIG. 2 is a schematic view according to Embodiment 2 of the invention.

As shown in FIG. 2, compared with the tank in Embodiment 1, in this embodiment the tank additionally comprises a transition tube 15 connected between the feed tube 2 and the circulation tube 5, a transition valve 16 arranged in the transition tube 15, a three-way valve 17 connected to the transition tube 15 and arranged at an outlet end of the feed valve 4, and a pneumatic valve 18 arranged on each of the feed tube 2 and the circulation tube 5 located between the transition tube 15 and the tank body 1.

During feeding, the feed valve 4, the transition valve 16, and the pneumatic valve 18 in the circulation tube 5 are opened, and the feed pump 3 is activated for pumping soy sauce. While it is by the continuous liquid-level detection apparatus 14 detected that the liquid level in the tank reaches 2.5 m, the pneumatic valve 18 in the feed tube 2 is opened firstly, and then the transition valve 16 is closed, the circulation pump 6 is activated at the same time, and the valve 9 in the circulation tube 5 is opened, so as to allow the soy sauce in the tank to be circulated and blended.

When it is by the continuous liquid-level detection apparatus 14 detected that the liquid level in the tank reaches 4.5 m, the feed pump 3 is deactivated, the feed valve 4 and the pneumatic valve 18 in the circulation tube 5 are deactivated as well, and the transition valve 16 is opened, so as to allow the soy sauce in the tank to be circulated through the circulation tube 5, the transition tube 15, and the feed tube 2. During feeding, only the circulation tube 5 is used for circulation. In this case, the feeding and blending are performed synchronously, such that the production efficiency is improved. While the feeding is completed, the circulation path is changed and extended, for more thoroughly blending of the soy sauce and more rapid stabilization of the amino acid nitrogen value, and consequently improved efficiency and quality of the blending.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

LIST OF REFERENCE NUMERALS

1 tank body
2 feed tube
3 feed pump
4 feed valve
5 circulation tube
6 circulation pump
7 flow meter
8 amino acid nitrogen value detection apparatus
9 valve
10 output tube
11 output control valve
12 high-liquid-level detection apparatus
13 low-liquid-level detection apparatus
14 continuous liquid-level detection apparatus
15 transition tube
16 transition valve
17 three-way valve
18, pneumatic valve.

The invention claimed is:

1. A soy sauce tank with circulation detection for amino acid nitrogen value control for soy sauce, comprising:
   a tank body;
   a circulation tube, arranged outside the tank body, and having an output end and an input end respectively connected to the tank body;
   a circulation pump, arranged in the circulation tube; and
   an amino acid nitrogen value detection apparatus, arranged in the circulation tube.

2. The soy sauce tank according to claim 1, further comprising a flow meter arranged in the circulation tube.

3. The soy sauce tank according to claim 1, further comprising a valve, which is controllable in its opening degree, arranged in the circulation tube.

4. The soy sauce tank according to claim 1, further comprising a liquid level detection apparatus arranged in the tank body.

5. The soy sauce tank according to claim 4, wherein the liquid level detection apparatus comprises a high-liquid-level detection apparatus, a low-liquid-level detection apparatus interlocked with the circulation pump, and a continuous liquid-level detection apparatus.

6. The soy sauce tank according to claim 1, further comprising an output tube arranged outside the tank body, wherein the output tube is connected to the circulation tube and disposed downstream of the amino acid nitrogen value detection apparatus.

7. The soy sauce tank according to claim 6, further comprising an output control valve arranged in the output tube.

8. The soy sauce tank according to claim 1, further comprising a feed tube arranged at the top of the tank body, a feed pump arranged in the feed tube and interlocked with a high-liquid-level detection apparatus.

9. The soy sauce tank according to claim 8, further comprising a feed valve arranged between the feed pump and the tank body.

10. The soy sauce tank according to claim 9, further comprising a transition tube connected between the feed tube and the circulation tube, and a three-way valve arranged at an outlet end of the feed valve and connected to the transition tube.

11. The soy sauce tank according to claim 10, further comprising a transition valve arranged in the transition tube.

12. The soy sauce tank according to claim 8, wherein the feed pump is made of stainless steel.

13. The soy sauce tank according to claim 1, wherein the tank body is made of glass fiber.

14. The soy sauce tank according to claim 1, wherein the circulation pump is made of stainless steel.

* * * * *